July 25, 1950 C. R. JACOBS 2,516,576
SELF-GOVERNING WIND-DRIVEN PROPELLER
Filed Jan. 4, 1947
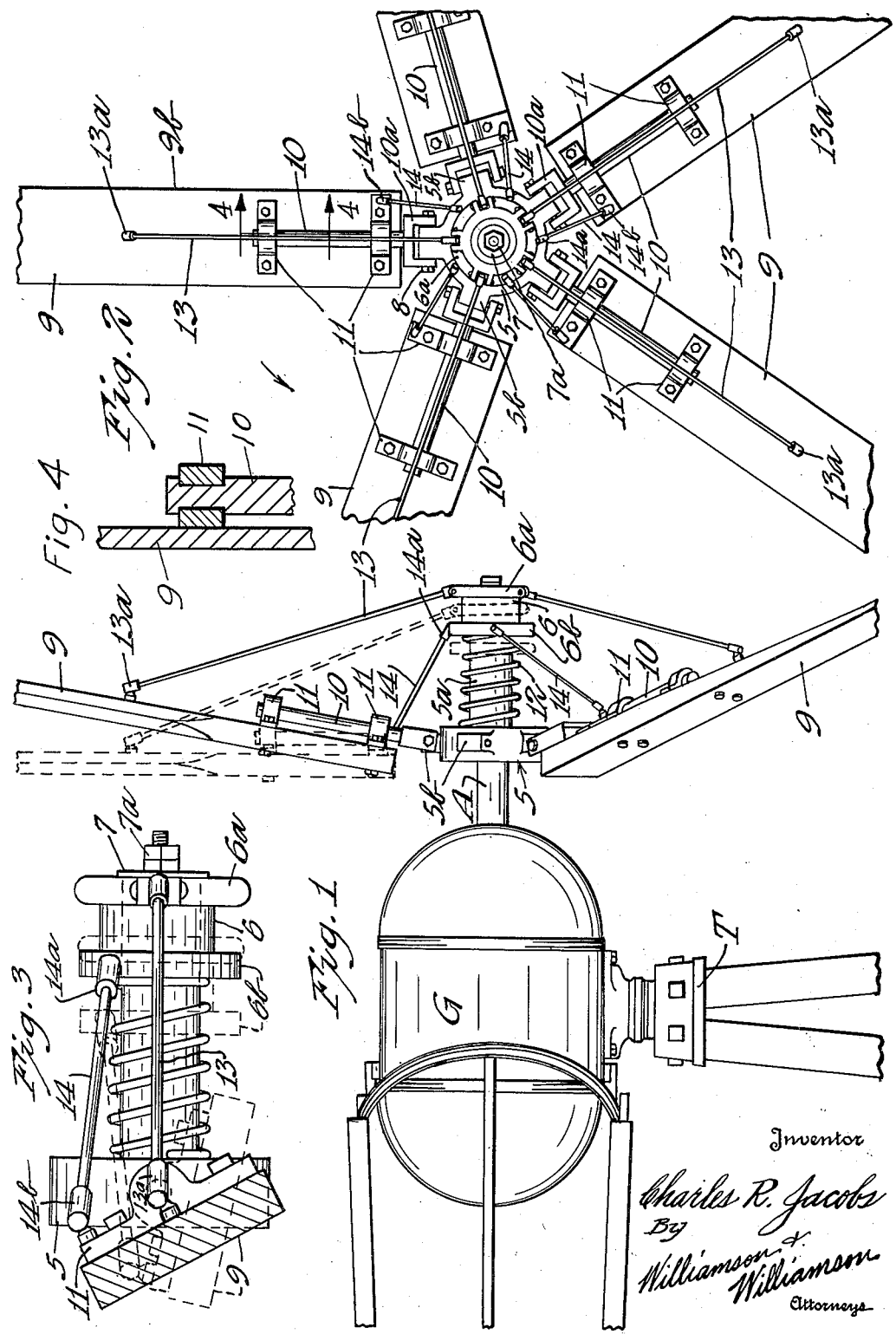
Inventor
Charles R. Jacobs
By
Williamson & Williamson
Attorneys Patented July 25, 1950

2,516,576

UNITED STATES PATENT OFFICE 2,516,576

SELF-GOVERNING WIND-DRIVEN PROPELLER

Charles R. Jacobs, Del Paso Heights, Calif.

Application January 4, 1947, Serial No. 720,160

5 Claims. (Cl. 170—69)

This invention relates to multi-blade, variable pitch, wind-driven propellers such as are used in wind electric plants and the like and more particularly, to propellers having speed-governing mechanism incorporated therein and combinatively associated with the blades.

In most wind electric propellers and the like, the two or three blades utilized are of the variable pitch airfoil principle mounted upon a rotary hub unit for governed and synchronized angular variation with reference to the general plane of the face of the propeller.

It is highly essential that the governing mechanism for controlling the speed of the propeller be highly responsive to R. P. M. variances to prevent overcharging of batteries in the wind electric system and to make possible immediate reduction in the load on the generator. Heretofore, most successful wind-driven propellers have employed governing mechanisms for varying the angulation or pitch of the several blades in accordance with the requirements of wind velocity and propeller speed which are responsive to centrifugal force rather than utilizing even as a factor, change in pressure or density of the air in which the propeller is operated.

It is an object of my invention to provide a simple but highly efficient speed-governing, wind-driven propeller which is immediately and highly responsive to speed and wind velocity variations, utilizing as cooperating components, both centrifugal force and wind velocity principles, to increase sensitivity.

More specifically, it is an object to provide a speed-governing propeller for wind-driven electric plants and the like, comprising a series of radially extending blades mounted for oscillation along longitudinal axes extending radially of a rotary hub and normally maintained in an outward, dished relation to the wind with governing mechanism which includes as elements, the blades and their mountings so constructed and related that change in wind velocity as well as centrifugal force through increased propeller speed, co-acts to change and make less effective the synchronized angulation of said blades as well as to swing said blades backwardly or inwardly away from their normal, forwardly dished relation with the hub unit.

A further and more specific object is the provision in a wind-driven propeller of the class described, utilizing a series of blades mounted for longitudinal oscillation as well as butt end hinged relation relatively to a hub unit, of a yieldably mounted governing annulus mounted co-axially of the hub unit and connected with the several blades in such manner as to normally hold the blades in dished relation and to feather the blades as well as swing them away from said dished relation responsive conjointly to centrifugal force and wind velocity.

These and other objects and advantages of my invention will be more apparent from the following description made in connection with the accompanying drawings wherein like reference characters refer to similar parts throughout the several views and in which:

Fig. 1 is a side elevation showing an embodiment of my improved propeller with the blades and governing mechanism disposed in normally low-wind-velocity position and with dotted lines indicating the moved position of some of the parts to produce governing action;

Fig. 2 is a front elevation of the same;

Fig. 3 is a fragmentary side elevation with one of the blades disposed in end view to the observer and with dotted lines indicating the extreme feathered position of the same blade;

Fig. 4 is a detail longitudinal section on a larger scale taken on the line 4—4 of Fig. 2.

In the form of my invention illustrated, my improved propeller is connected with the projecting forward end of an armature shaft A of a conventional wind electric generator G mounted in the usual manner for swivelling upon the top of a suitable tower T. Armature shaft A is affixed thereto, a hub unit indicated as an entirety by the numeral 5 which rigidly carries or has integrally formed therewith, a tubular forward extension 5a adapted to telescope over the outer extremity of armature shaft A and providing a smooth, cylindrical guide for a governing annulus or sleeve 6 journaled for oscillation and slidable action thereon. Annulus 6 is retained upon hub extension 5a against longitudinal and outward displacement by suitable means such as a disc 7 fixed to outer extremity of armature shaft A by means of a nut 7a threaded to the diminished extremity of said shaft.

Hub unit 5 is provided with a circumferentially spaced series (as shown in the drawings, 5) of radial, blade attachment lugs 5b, each having a pintle bearing formed transversely therethrough for accommodating hinge pintles 8 for connection of the several propeller blades 9. The pintle bearings and hinge axes for the several blades it will be noted, all lie in a common plane extending perpendicularly of the hub axis and parallel with the face of the hub unit.

The several blades 9 are each provided with a central and longitudinally extending mounting stem 10 which is journaled at widely spaced zones in bearing cleats 11 fixed to the forward faces of the blades, the bearings preferably surrounding slightly diminished zones of stems 10 to prevent longitudinal displacement of the blades and of course, permitting the blades to oscillate on their longitudinal axes. Mounting stems 10 are provided at their inner ends with bifurcated attachment brackets 10a which straddle the blade-attachment lugs 5b of the hub and are hinged thereto by pintles 8.

A coil expansion spring 12 surrounds the hub extension 5a and is interposed between the forward face of hub unit 5 and the inner face of governing annulus 6, urging said annulus outwardly.

Two sets of actuating connections are interposed between the annulus 6 and the propeller blades adapted in cooperation to normally maintain and synchronize the blades in a forwardly dished relationship to the hub unit 5 and angled for greatest wind-reacting efficiency. One set of said actuating connections, in the form shown, comprises a plurality of radius rods 13, one for each blade, hinged as shown at its inner end between lugs or in grooved portions of an outer flange 6a of the governing annulus 6 and connected by universal or ball and socket joint 13a at its outer and rearward end to an intermediate point in the longitudinal center line of the associated blade, said last mentioned point of connection being preferably spaced some distance outwardly of the butt end of the blade. The length of radius rods 13 and points of their connection with the blades are so related that in the outermost or forward position of annulus 6, the blades will be hinged or swung forwardly, giving the entirety of the propeller a dished relation relative to the hub unit 5.

The second set of actuating connections comprise as shown, a series of shorter, biasing or blade-feathering rods 14 connected by universal or ball and socket joints 14a at their forward ends with a rear, circumferential flange 6b provided by annulus 6 and connected at their rear or outer ends with the butt portions of the respective blades 9 with which they are associated. Said blade connections are preferably in the form of universal or ball and socket joints 14b which are disposed eccentrically of blade mounting stems 10 and as shown, are close to the trailing edges 9b of said blades.

*Operation*

When the wind velocity is low, the blades and actuating elements of my propeller are normally disposed in the positions shown in full lines in Figs. 1 and 3, the coil spring 12 yieldingly maintaining the governing annulus 6 in the extreme outward position and the radius rods 13 and biasing rods 14 in combination, maintaining the blades in forwardly tilted dished relation relatively to the hub 5 and angled most favorably for reception of the wind.

When wind velocity is increased and/or the speed of revolution of the propeller exceeds a predetermined R. P. M., two factors simultaneously affect the feathering and also hinged relation of the blades 9.

The increased centrifugal force through speeding up of the propeller, tends to straighten out the blades from the forwardly dished to an approach to true radial position and increased wind velocity simultaneously tends to swing the several blades in synchronization, rearwardly from the dished position shown in full lines. The two forces are of course, resisted by coil spring 12 and the bodily swinging and twisting of the blades on longitudinal axes is of course, dependent upon the longitudinal movement with accompanying slight turning of the governing annulus 6.

Thus, my governing mechanism, through the utilization of two force components, wind velocity and centrifugal force, is extremely responsive to speed and wind variations.

From the foregoing description, it will be seen that I have provided a simplified, but highly efficient speed-governing, wind-driven propeller, particularly well adapted for use in wind electric plants and other apparatus where very accurate governing of speed to prevent overloading of the generator and within narrow limits, is desired.

It will of course, be understood that various changes may be made in the form, details, arrangement and proportions of the parts without departing from the scope of my invention.

What I claim is:

1. A self-governing, wind-driven propeller comprising a hub unit adapted for mounting upon a propeller shaft, a governing annulus also adapted for mounting on said shaft, said annulus being longitudinally movable relative to said hub unit, a plurality of propeller blades extending always radially from said hub unit and mounted thereon for pivotal movements about their longitudinal axes and for swinging movement at their inner ends, means for urging said hub unit and governing annulus towards widely spaced relation, a series of connecting rods each connected at its forward end with said annulus and at its rear end with an intermediate point on the longitudinal axis of one of said blades said rods being of such relationship as to normally hold said blades forwardly in dished relation to said hub unit and a second series of connecting rods, each connected at its rearward end by universal type joint with one of said blades at a point eccentric to the longitudinal axis thereof and connected at its forward end by a universal type joint with said governing annulus.

2. The structure set forth in claim 1 wherein the connection of said last mentioned series of connecting rods with said blades is disposed in each case adjacent the trailing edge of the blade.

3. A self-governing propeller for wind-driven electric plants and the like, comprising a rotary hub unit, a plurality of propeller blades extending radially outward from said hub unit and mounted thereon for pivotal movements about their longitudinal axes and for swinging movement along axes at their inner ends disposed in the general plane of the face of said hub unit, an annular member mounted co-axially of said hub unit and mounted for oscillation and also longitudinal sliding movement relative to said unit, a series of connections corresponding to said number of blades, each connecting said annular member with an intermediate longitudinal portion of one of said blades and of such relationship as to normally hold said blades forwardly in dished relation to said hub unit, means for urging said annular member outwardly with respect to said hub unit and a second set of connections between said annular member and the butt portions of said blades, said last mentioned connections being eccentrically disposed relative to the longitudinal axes of said blades to twist said blades when said annular member is moved inwardly towards said hub unit, wind pressure and centrifugal force both constituting factors in swinging said blades inwardly, away from fully dished position.

4. The structure set forth in claim 3 wherein said hub unit includes a co-axial forward extension upon which said annular member is mounted.

5. A self-governing, wind-driven propeller, comprising a hub unit mounted upon a propeller shaft, a governing annulus also mounted upon said shaft and being longitudinally movable relative to said hub unit, a plurality of propeller blades mounted on said hub unit and extending radially thereof at all times, the mounting for said blades including elongated stems extending radially of said hub unit and cooperating bearings, said mounting also including hinged connection of said stems with said hub member on axes which extend in the general plane of revolution of said propeller, means for urging said hub unit and governing annulus towards widely spaced relations, synchronized connections between said annulus and said propeller blades adapted to normally maintain said blades in at least approximation to forwardly dished relation with freedom for backward swinging of said blades and synchronized connections between said annulus and points eccentric of the longitudinal axes of said blades adjacent the butts thereof for normally maintaining said blades at favorable wind-receiving pitch and for feathering said blades to decrease effective pitch when said blades are swung backwardly.

CHARLES R. JACOBS.

REFERENCES CITED

The following references are of record in the file of this patent:

UNITED STATES PATENTS

| Number | Name | Date |
|---|---|---|
| 232,815 | Gray | Oct. 5, 1880 |
| 249,715 | Willner | Nov. 15, 1881 |
| 458,070 | Rusk | Aug. 18, 1891 |
| 2,094,941 | Burkhartsmeier | Oct. 5, 1937 |

FOREIGN PATENTS

| Number | Country | Date |
|---|---|---|
| 2,529 | Australia | June 1, 1932 |
| 103,263 | Austria | May 10, 1926 |
| 325,172 | Italy | Mar. 2, 1935 |
| 811,726 | France | Jan. 23, 1937 |